3,563,796
PROCESS FOR PREPARATION OF
POLYACROLEIN FILMS
Kiyoshi Yamaki, Tokyo-to, Shigeyuki Suzuki, Sagamihara-shi, and Satoshi Fujimoto, Tokyo-to, Japan, assignors to Kureha Kagaku Kogyo Kabushiki Kaisha, Tokyo-to, Japan
No Drawing. Filed May 27, 1966, Ser. No. 553,327
Claims priority, application Japan, May 31, 1965,
40/31,833
Int. Cl. C08f 3/40; C08g 37/02
U.S. Cl. 117—161    4 Claims

ABSTRACT OF THE DISCLOSURE

Process for the preparation of resinous films having excellent mechanical and solvent resistant properties comprising forming a film in the presence of an acid of an acetal of a poly-(alpha, beta-ethylenically unsaturated) aldehyde and heating the resulting film at a temperature of from about 70° C. to about 280° C.

---

This invention relates to a novel process for preparation of resinous films which have thermosetting properties. More particularly, an object of this invention is to provide a novel process for obtaining resinous dried films having excellent mechanical and chemical properties by the use of high molecular weight acetals obtained by reaction of alcohols with polymers of $\alpha,\beta$-ethylenically unsaturated aldehydes.

A polyacrolein, which is a typical polymer made by the polymerization of an $\alpha,\beta$-ethylenically unsaturated aldehyde, is insoluble in common organic solvents and is unmeltable. However, acetals which are products prepared by the reaction of various alcohols with polyacrolein are soluble and are thermoplastic materials. These acetals are readily soluble in many organic solvents. The resulting solutions of polyacrolein acetals are promising for use as coating materials. The dried films obtained from such solutions are very tough, i.e., they have good impact resistance, flexibility, and hardness. Moreover, they have good abrasion resistance and good adhesiveness to metal, glass, plastics, wood, and cellulose film.

Generally speaking, polyacrolein acetals are good materials for the preparation of dried films having good mechanical properties. However, such dried films are deficient in solvent resistance.

In general, solvent resistance is very important for dried films when employed for coatings and in other practical uses. Accordingly, it is very important to improve the solvent resistance of polyacrolein acetals.

As a result of intensive study of these resins and their dried films, we have found surprisingly that by a certain process, these dried films become insoluble and solvent resistant without any loss of their excellent mechanical properties.

This invention relates to this process for improvement of the solvent resistance of these resins.

A particular object of this invention is to provide useful catalysts for rendering the resins solvent resistant in accordance with the process of this invention. Other objects of the invention will be apparent hereinafter.

According to this invention, the above mentioned dried films of polyacrolein acetals are improved in their solvent resistance by subjecting them to heat treatment after having been coated from their solutions and dried with catalysts rendering them insoluble. These catalysts are acids such as hydrochloric acid, phosphoric acid, p-toluene sulfonic acid, Lewis acids, and metallic salts of organic acids selected from naphthenic acid, higher fatty acids having more than twelve carbon atoms such as stearic acid and oleic acid. A further description of these catalysts is set forth hereinafter.

Generally speaking, dried films with high hardness values and good solvent resistance are brittle and have poor impact strength, flexibility, and adhesiveness to materials coated therewith. On the other hand, films with good impact strength and flexibility are deficient in solvent resistance and hardness of surface. For example, melamine resin produces a dried film having excellent solvent resistance but is so brittle and poor in impact strength, flexibility and adhesiveness, that it is unsuitable for use as a coating material by itself. On the contrary, alkyd resins are superior in flexibility and adhesiveness, but cannot be used independently for coating purposes because its surface is not hard enough. Consequently, mixtures of these two types of resins are generally used as paints for automobiles and electrical instruments. Even in these cases, the hardness of the dried films is sacrificed somewhat to maintain adhesiveness.

Thus, an urgent requirement of the prior art is to provide a material having both of above mentioned complementary characteristics.

This invention makes a valuable contribution to the paint industry by fulfilling this requirement.

Catalysts used in this invention contain inorganic acids such as hydrochloric acid, phosphoric acid, and boric acid; Lewis' acids such as boron trifluoride, antimony pentachloride, stannic tetrachloride, and ferric chloride; and organic acids such as formic acid, dichloroacetic acid, trichloroacetic acid, benzene sulfonic acid, and p-toluenesulfonic acid. The quantity of catalyst used in this invention can vary from 0.005 to 5.0% by weight, particularly from 0.01 to 1.5%, of the resins used.

Certain metal salts of organic acids can be used with the acids mentioned above as accelerators. The metal of these salts is selected from silver, cobalt, iron, and copper; and the organic acid is selected from naphthenic acid, higher fatty acids having more than twelve carbon atoms such as linoleic acid, oleic acid, stearic acid, palmitic acid, myristic acid, and lauric acid.

Heat treatment is also essential to achieve complete solvent resistance in this invention. The heat treatment is performed by heating the dried film, which includes or does not include catalysts, at from 70° C. to 280° C. for a period of from 30 seconds to 130 minutes in the presence of air.

It is an unexpected phenomenon that acetals obtained from poly($\alpha,\beta$-ethylenically unsaturated) aldehydes produce dried films having simultaneously good solvent resistance, impact strength, flexibility, adhesiveness, and high hardness as a result of the above described process. The mechanisms of the changes caused by these processes are extremely interesting for future academic study, but explanation thereof is not essential for the present invention.

By $\alpha,\beta$-ethylenically unsaturated aldehydes used in the present invention is meant acrolein, methacrolein, and croton aldehyde. A polyacrolein is considered to have the following structure

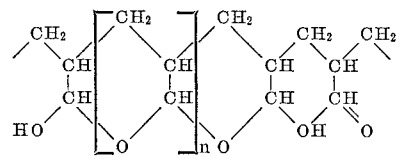

where $n$ is an integer varying from 0 to 5.

Acetals prepared by its reaction with alcohols are considered to have the following structure.

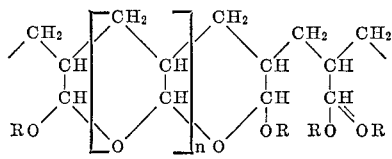

where $n$ is the same as above, and R denotes residual groups of the alcohols used.

The alcohols usable in this invention are aliphatic alcohols such as methyl alcohol, ethyl alcohol, propyl alcohol, butyl alcohol, octyl alcohol, allyl alcohol, methyl-vinyl alcohol, etc., and substituted alcohols such as β-chloroethyl alcohol, β-nitroethyl alcohol, ethylene glycol, glycerol, pentaerythritol, sorbitol, benzyl alcohol, phenylethyl alcohol, etc.

Catalysts are sometimes used for the preparation of acetals from polyacrolein and alcohol in order to accelerate the reaction. The catalysts are also acidic substances analogous to those which are used in this invention to accomplish improvement of solvent resistance and are, for example, hydrochloric acid, p-toluene sulphonic acid, and Lewis' acids such as boron trifluoride. Suitable amounts of these catalysts can often be retained in the products and used as insolubilizing catalysts in the process of this invention.

When the molecular weight of a polyacrolein acetal is low, the dried film exhibits somewhat poor mechanical properties. When the molecular weight is excessively high, the viscosity of the solution becomes too high to handle. Therefore, it is preferable to use as a starting material a polyacrolein which has a viscosity number ($\eta_{sp/c}$) varying between 0.07 and 0.5 l./g. (This viscosity number is determined by dissolving polyacrolein in 10% aqueous solution of sulfur dioxide to obtain a concentration thereof of 10 g./l., adding to 10 cc. of this solution 10 cc. of 5% sodium chloride solution, and measuring the viscosity by means of Ostwald's viscometer at 30° C. $\eta_{sp/c}$ is determined by calculation based on the data, where $\eta_{sp}$ is the specific viscosity, and c. is the concentration of the solution in g./l.)

Acetals obtained by the above mentioned process are utilized in the form of solutions thereof in common organic solvents such as benzene, toluene, xylene, ethyl-acetate, butyl acetate, butyl alcohol, and dioxane.

To illustrate the manner in which the invention may be carried out, the following examples are presented. It is to be understood, however, that the examples are for the purpose of illustration, and the invention is not to be regarded as being limited to any of the specific materials and conditions recited therein.

EXAMPLE 1

A three-necked reaction vessel with a thermometer and agitator was charged with 600 g. of water, 1.5 g. of silver nitrate, and 150 g. of acrolein. The reaction vessel was flushed with nitrogen and sealed, and the contents were agitated at 10° C. for 2 hours. A white solid polyacrolein precipitated in a muddy state during this period. The product was promptly filtered, thoroughly washed with water and acetone, and dried in a desiccator. The viscosity number of the polymer so produced was 0.16 l./g.

60 g. of this polyacrolein was placed in a three-necked reaction vessel with an agitator and reflux condenser and covered with 250 g. of butyl alcohol and 500 g. of dioxane. After the mixture was stirred for 30 minutes at room temperature, 6.0 g. of p-toluene sulfonic acid was added, and the resulting batch was heated at 70° C. under further agitation until the polymer dissolved away through reaction. 20 g. of barium carbonate was added to the resulting viscous solution in order to remove completely p-toluene sulfonic acid. After filtration, the solution was poured into water to precipitate the acetal formed. Reprecipitation was carried out two times to purify the acetal. As a result, 54 g. of butyl acetal was obtained.

In the same manner various acetals were prepared. Each of these acetals was dissolved in toluene to produce a 10% viscous solution. Colourless, clear dried films with and without 0.5% of p-toluene sulfonic acid were prepared on the surface of glass, iron, and aluminium plates, respectively, from the resulting solutions. The thickness of each film was about 0.025 mm. Then heat treatment was carried out on the films thus coated at 150° C. for 30 minutes in an oven.

Results of tests carried out on the resulting films are shown in the following Table 1. It is obvious that the solvent resistances of the dried films were improved markedly without any deterioration of their important mechanical properties.

TABLE 1

| Acetal | p-TsOH [1] added, weight percent | Hardness, Sward | Impact resistance | Flexibility | Adhesiveness | Solvent resistance |
|---|---|---|---|---|---|---|
| Methylacetal | 0 | 39 | Excellent | Excellent | Excellent | Poor. |
|  | 0.5 | 40 | do | do | do | Good. |
| Butylacetal | 0 | 30 | do | do | do | Poor. |
|  | 0.5 | 31 | do | do | do | Good. |
| Octylacetal | 0 | 12 | do | do | do | Very poor. |
|  | 0.5 | 12 | do | do | do | Good. |
| Benzylacetal | 0 | 29 | do | do | do | Poor. |
|  | 0.5 | 30 | do | do | do | Good. |

[1] p-TsOH denotes p-toluene sulfonic acid.

The properties of the dried films vary over a wide range depending on the variety of alcohol used for acetalization. Methyl alcohol produces a very hard acetal which as a dried film has a Sward value of 40. Conversely, octyl alcohol produces a soft acetal whose Sward value is lower than 15. Butyl alcohol produces an acetal of intermediate Sward value.

It is notable that all acetal films of the invention have ample adhesiveness and toughness regardless of their hardnesses.

Acetals of poly-α,β-ethylenically unsaturated aldehyde may be used as coating materials, vehicles for printing-ink, films, and adhesives.

These tests were carried out by the following methods:

Hardness—Sward rocker method (JIS K 5650)

The Sward rocker method is generally applied to test the hardness of dried films, and hardnesses of above 20 are required for films in the automobile industry.

Flexibility—Bend method (JIS K 5440, analogous to ASTM-D-1308)

The specimen is an aluminium plate (0.6 mm. thickness) coated with acetal. After a steel rod is placed on the uncoated surface of the specimen, the plate is bent completely around the rod within 1 sec., and the degree of bending is varied by changing the diameter of the rod. Stripping or cracking on the bent coated surface is observed, and flexibility is determined by the observation.

Impact resistance—Du Pont type tester (JIS K 5530)

After steel ball (diameter ½ inch and weight 500 g.) is dropped vertically from a height of 50 cm. onto the coated surface of an iron plate (4 mm. thickness), the appearance of the part which has yielded is examined.

Adhesiveness—Cross cut method

Thin streaks are made crosswisely at intervals of 1 mm. to make one hundred squares of 1 mm. x 1 mm. on the surface of the specimen used in the flexibility test with a diamond knife (weight 100 g.), and these small pieces of the dried film are stripped by a cellophane tape stuck onto the surface. The number of the stripped pieces determines the adhesiveness of the resin.

Solvent resistance

A drop of a solvent (benzene) is put on the dried film. The change of the surface is observed during and after the evaporation of the solvent.

EXAMPLE 2

Films prepared from polyacrolein butylacetal containing various quantities of p-toluene sulfonic acid were tested to determine the quantity necessary to render the film solvent resistant. The results are shown in Table 2.

TABLE 2

| p-TsOH added, percent by weight | Discoloration after baking [1] | Solvent resistance |
|---|---|---|
| 0.0000 | None | Poor. |
| 0.005 | do | Fair. |
| 0.01 | do | Good. |
| 0.05 | do | Do. |
| 0.1 | do | Do. |
| 0.5 | do | Do. |
| 1.0 | do | Do. |
| 2.0 | Slightly yellow | Do. |

[1] Baking means the heat-treatment mentioned hereinbefore.

EXAMPLE 3

Dried films of polyacrolein butylacetal containing various acids, respectively, were prepared on the surfaces of glass, iron, aluminium plates. These films were tested by the same methods as in Example 1. The results (Table 3) show that the catalysts mentioned herein for this invention give good dried films.

TABLE 3

| Variety and quantity of catalyst added, weight percent | Solvent resistance | Solvent extraction, percent |
|---|---|---|
| None | Poor | 100 |
| HCl, 0.3 | Good | 0 |
| H₃PO₄, 0.3 | do | 0 |
| Benzene sulfonic acid, 0.1 | do | 0 |
| BF₃-ethyl etherate, 0.2 | do | 0 |
| Formic acid, 1.0 | do | 2 |
| Dichloroacetic acid, 1.0 | do | 1 |

Solvent extraction was carried out by means of Soxhlet Extractor with the use of benzene as a solvent.

EXAMPLE 4

Allyl acetal of polyacrolein was prepared by the same method as set forth in Example 1. Dried films on glass plates containing 0.5% of p-toluene sulfonic acid as a catalyst for baking and various amounts of metallic salts of organic acids as accelerators were obtained and baked at 150° C. for 30 minutes. The solvent resistances of these films were tested. Table 5 shows that such metallic salts are effective as accelerators when they are used with p-toluene sulfonic acid.

TABLE 5

| Metallic salt, percent | Solvent resistance | Metallic salt, percent | Solvent resistance |
|---|---|---|---|
| Cobalt naphthenate, 0.0000 | Poor | Silver naphthenate, 0.01 | Good. |
| Cobalt naphthenate, 0.0005 | Do. | Copper naphthenate, 0.01 | Do. |
| Cobalt naphthenate, 0.001 | Good. | Copper stearate, 0.001 | Do. |
| Cobalt naphthenate, 0.01 | Do. | Iron naphthenate, 0.01 | Do. |
| Cobalt naphthenate, 0.1 | Do. | Do | Poor.[1] |
| Cobalt naphthenate, 1.0 | Do. | Cobalt naphthenate, 0.01 | Do.[1] |

[1] These two samples were tested without p-toluene sulfonic acid.

What we claim is:

1. A process for the preparation of resinous films having excellent mechanical and solvent resistant properties consisting essentially of the steps of forming a film on a substrate, in the presence of an acid and an accelerator comprising a metallic salt of an organic acid, from a solution of an acetal of polyacrolein in an inert solvent therefor, wherein the amount of said acid is in the range of from about 0.005% to about 5% by weight, based on the amount of acetal, and heating said film at a temperature of from about 70° C. to about 280° C. for a period of time in the range of from about 30 seconds to 130 minutes.

2. A process for the preparation of resinous films as claimed in claim 1, in which said acid is selected from the group consisting of formic acid, dichloroacetic acid, trichloroacetic acid, benzenesulfonic acid, and p-toluenesulfonic acid.

3. A process for the preparation of resinous films as claimed in claim 1, in which the metal of the metallic salt of an organic acid is selected from the group consisting of silver, cobalt, iron and copper and the organic acid is selected from the group consisting of naphthenic acid and higher fatty acids, the amount of said metal salt being 0.001 to 1.0 weight percent based on the acetal.

4. The process according to claim 3 wherein the said is p-toluenesulfonic acid.

References Cited

UNITED STATES PATENTS

| 2,467,430 | 4/1949 | Izard | 260—67X |
| 2,870,121 | 1/1959 | Kraft | 260—67 |
| 2,970,985 | 2/1961 | Guest et al. | 260—67 |
| 3,000,862 | 9/1961 | Eifert et al. | 260—67 |
| 3,129,195 | 4/1964 | June et al. | 117—161X |
| 3,154,599 | 10/1964 | Wismer et al. | 117—161X |
| 3,184,441 | 5/1965 | Fang | 117—124X |

FOREIGN PATENTS

| 797,459 | 7/1958 | Great Britain | 117—161 |
| 849,401 | 9/1960 | Great Britain | 260—67 |
| 941,423 | 11/1963 | Great Britain | 260—67 |

WILLIAM D. MARTIN, Primary Examiner

M. R. P. PERRONE, Jr., Assistant Examiner

U.S. Cl. X.R.

117—124, 132; 260—67